P. M. Wright,
Cotton Press.
N° 3,835. Patented Nov. 26, 1844.
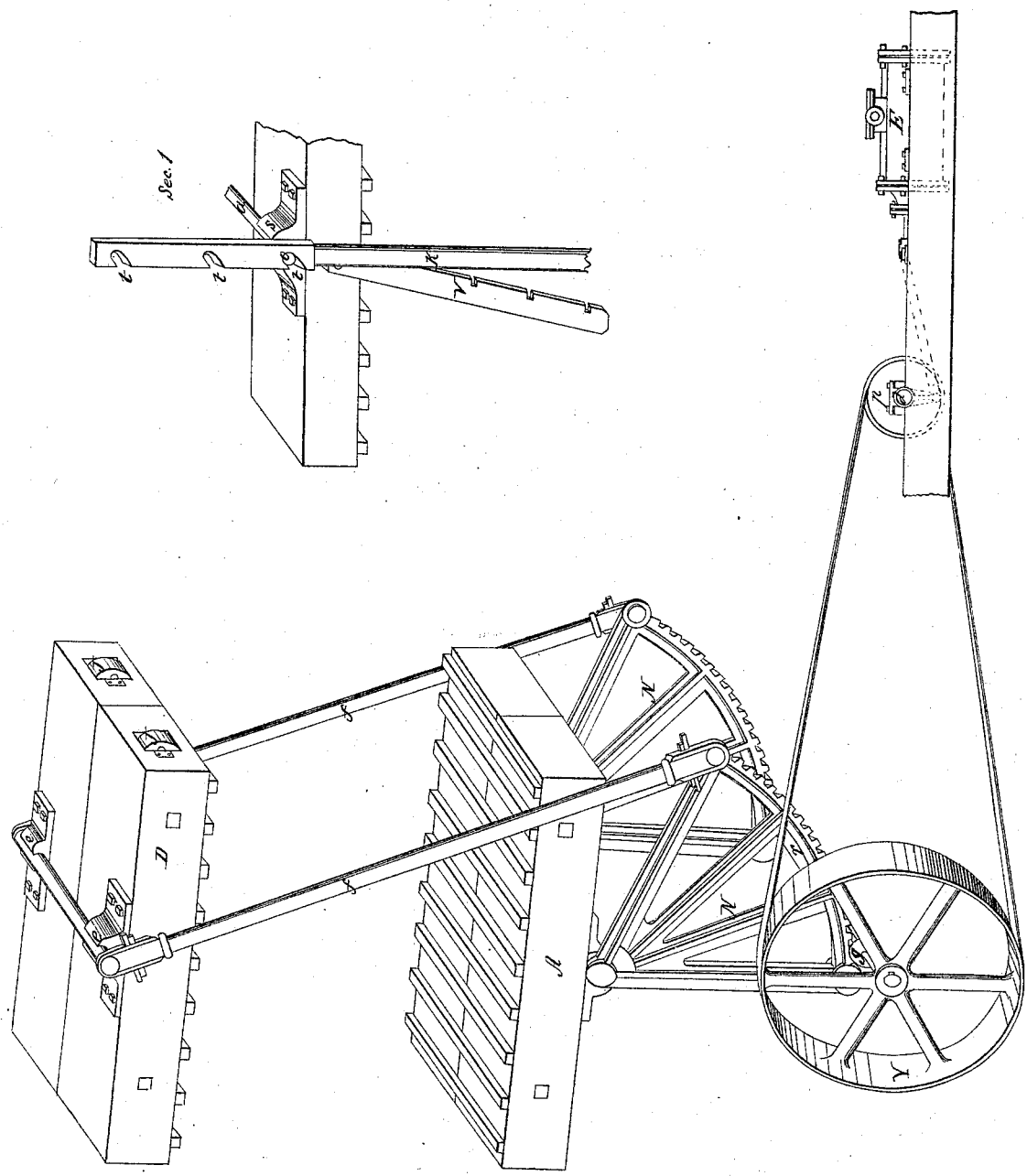

UNITED STATES PATENT OFFICE.

PETER M. WRIGHT, OF NEW YORK, N. Y.

IMPROVEMENT IN COTTON-PRESSES.

Specification forming part of Letters Patent No. 3,835, dated November 26, 1844.

*To all whom it may concern:*

Be it known that I, PETER M. WRIGHT, of the city of New York, of the State of New York, have invented a new and useful Machine for Packing or Compressing Cotton, Hay, or Tobacco; and I do hereby declare that the following is a full, clear, and exact description thereof.

I claim no new principle further than the principle involved or resulting from the combination of known principles. The screw, lever, or the wheel and axle are the agents in general use or combinations by which great pressure is commonly obtained. The latter power is more particularly concerned in the construction of my press, which is as follows: I hang two quarters or less of a spur-wheel upon their centers bearing in plummer-blocks bolted up under the bed or platform of the press, which may lie upon a warehouse-floor or frame constructed more particularly for its support. These quadrants or quarter sections or segments of a wheel are the agents more directly participating in the object (that of pressure) for which my invention is designed. I place one upon each side of the bed, which is connected to the follower of corresponding shape and size, immediately over, by connecting rods or levers corresponding in length to the sums of the fall or the radius of the segment as these rods are connected to their peripheries and that of the bulk of the substance of pressure or the minimum distance between the follower and platform. The nature or characteristic of this machine, then, consists in the action of the peripheries of a wheel or wheels upon rods or levers, by which they are connected to a follower, producing an effect similar in action to that of a toggle-joint, and may be considered as one inverted, the pressure depending upon the semidiameter or radius of the segment, and may be increased in a ratio in proportion to the increase of the radius, or in the parallel direction of the arms of the segments with that of connecting rods or levers.

For an illustration of this machine, as herein specified, reference is here made to the drawings accompanying this specification, where—

A represents the platform or bed; D, follower; $e\ e\ e$, bearings; $f\ f$, connecting-rods; J J, rollers to counteract the friction, which would be otherwise produced by the lateral action of the butts of the follower upon the cheeks of the press; N N, segments gearing into the pinions $g\ g$.

The large pulley Y, keyed upon the pinion-shaft $r$, communicates motion to the machine, and is driven or managed, as here represented, by the steam-engine E, by a band passing over a tight or loose pulley, $p$, upon the crank-shaft $d$; but this particular gearing or application of the power, which may be either steam or horse, is not essential. Other arrangements—such as a tight or loose pinion upon the crank-shaft—acting upon a toothed wheel in place of the pulley Y, may be more appropriate.

To increase the stroke or fall of the follower, I prolong the connecting rods or levers, pierced with three or more sockets to suit the shaft or pins upon the follower, from which they may be detached after its first pressure, and their action again renewed by the alternate motion of the segments, to which they are attached. The follower in the meantime is held to its gage by two or more ratchets, in connection with the bed or platform. Section 1 explains this arrangement in figure, as K, connecting-rods; $t\ t\ t$, sockets attached to the pin $o$ in the bearing $s$ upon the follower; V, ratchet, from which, it may readily be perceived, the press may be adapted for packing the most loose and spongy substances.

I claim—

The method of increasing the capacity of the press by prolonging the upper ends of the connecting rods or levers, in connection with the ratchet, as herein described and set forth.

PETER M. WRIGHT.

Witnesses:
 COM. AGNEW,
 PIERRE M. IRVING.